United States Patent [19]

Byrd et al.

[11] Patent Number: 4,601,862
[45] Date of Patent: Jul. 22, 1986

[54] DELAYED QUICK CURE ROCKET MOTOR LINER

[75] Inventors: James D. Byrd; Robert T. Davis, both of Huntsville, Ala.

[73] Assignee: Morton Thiokol, Inc., Chicago, Ill.

[21] Appl. No.: 750,209

[22] Filed: Jul. 1, 1985

Related U.S. Application Data

[63] Continuation-in-part of Ser. No. 579,221, Feb. 10, 1984.

[51] Int. Cl.$^4$ .............................................. C06B 21/00
[52] U.S. Cl. ........................................ 264/3.1; 149/2; 149/19.9; 102/290
[58] Field of Search ................... 149/2, 19.9; 102/290; 264/3 R

[56] References Cited

U.S. PATENT DOCUMENTS

| | | |
|---|---|---|
| 3,908,358 | 9/1975 | Sutton et al. ............................ 60/219 |
| 3,993,514 | 11/1976 | Pacanowsky et al. ............. 149/19.9 |
| 4,019,933 | 4/1977 | Cucksee et al. ..................... 149/19.9 |
| 4,184,031 | 1/1980 | Graham et al. ..................... 149/19.4 |
| 4,209,351 | 6/1980 | Pierce et al. ......................... 102/290 |
| 4,304,185 | 12/1981 | Sayles ................................... 149/19.2 |
| 4,429,634 | 2/1984 | Byrd et al. ............................ 102/290 |
| 4,527,389 | 7/1985 | Biddle et al. ........................... 149/75 |

*Primary Examiner*—Edward A. Miller
*Attorney, Agent, or Firm*—George F. Wheeler; Gerald K. White

[57] ABSTRACT

An improvement to the process of applying a rocket motor liner to an inside surface of a rocket motor casing by coating the casing with a rocket motor liner composition and then curing the liner composition. Typical rocket motor liner compositions include the product of a hydroxyl-terminated polybutadiene prepolymer; a diisocyanate curing agent for forming urethane linkages with said prepolymer; a trifunctional aziridine bond promoter; a filler; and a curing catalyst comprising maleic anhydride, magnesium oxide, and triphenyl bismuth. This invention may use an alkaline carbon black filler and/or a curing catalyst which does not include magnesium oxide.

6 Claims, No Drawings

DELAYED QUICK CURE ROCKET MOTOR LINER

The U.S. Government has a nonexclusive, nontransferable, royalty-free license to make, use or sell the claimed invention pursuant to Contract No. F06411-75-C-0059, awarded by the Department of the Air Force to Thiokol Corporation.

This application is a continuation-in-part of co-pending application serial number 579,221 filed February 10, 1984 and entitled "Delayed Quick Cure Rocket Motor Liner".

BACKGROUND OF THE INVENTION

The invention relates to an improved composition for use as a liner layer in a rocket motor. Rocket motors employing solid propellants typically comprise a rigid outer casing or shell; a heat insulating layer (insulation) bonded to all or part of the inner surface of the casing; a liner layer (liner) bonded to the insulating layer; and a solid propellant grain bonded to the liner. The insulation is generally fabricated from a composition capable of withstanding the high temperature gases produced when the propellant grain burns, thus protecting the casing (or selected parts of it). The liner is an elastomeric composition which bonds the solid propellant grain to the insulation and to any uninsulated portions of the casing.

Improvements in propellant processing taught in U.S. Pat. Nos. 4,110,135 and 4,184,031, respectively issued to Graham, et al. on Aug. 29, 1978 and Jan. 15, 1980, which patents are incorporated herein by reference, reduce the propellant cure time and increase its pot life. Thus, the propellant can be mixed, stored, and worked for relatively long periods of time without prematurely curing, but once the cure is initiated it proceeds rapidly to completion. Graham, et al. achieved these advantages by using a propellant binder system comprising hydroxyl terminated polybutadiene based polyurethane (the reaction product of a hydroxyl terminated polybutadiene prepolymer and a polyisocyanate curing agent) and a curing catalyst comprising a mixture of magnesium oxide, maleic anhydride or maleic acid, and triphenyl bismuth.

For Graham, et al., a carboxylic acid anhydride such as maelic anhydride is suitable only because it is convertible to a carboxylic acid. This is because the catalyst is a metal salt produced by the reaction of triphenyl bismuth with a carboxylic acid and magnesium oxide is utilized to regulate the rate of catalysis.

Thus, when a carboxylic acid anhydride is used, that anhydride must first be converted to a carboxylic acid. The thus formed carboxylic acid must be sufficiently long lived to react with the triphenyl bismuth to form the operative metal salt catalyst.

Based on Graham, et al., a carboxylic acid anhydride, triphenyl bismuth, magnesium oxide curing catalyst would not be expected to work in an alkaline environment. First, because alkalinity would not be conducive to the formation of a carboxylic acid. Secondly, because alkalinity would be expected to neutralize any carboxylic acid present and prevent the formation of the Graham, et al. metal salt catalyst. Graham, et al. also teaches the use of carbon black as an optional propellant additive. However, there is no disclosure or teaching or suggestion to use alkaline carbon black which provides an alkaline propellant environment.

SUMMARY OF THE INVENTION

This invention involves two improvements to the process of applying a rocket motor liner to an inside surface of a rocket motor casing by coating the casing with a rocket motor liner composition and then curing the liner compositions. The first improvement involves using a rocket motor liner composition comprising the product of a hydroxyl terminated polybutadiene prepolymer; a diisocyanate curing agent for forming urethane linkages with said prepolymer; a trifunctional aziridine bond promoter; an alkaline carbon black filler which provides an alkaline environment; and a curing catalyst comprising a carboxylic acid anhydride, magnesium oxide, and triphenyl bismuth. The second improvement involves using a rocket motor liner composition comprising the product of a hydroxyl terminated polybutadiene prepolymer; a diisocyanate curing agent for forming urethane linkages with said prepolymer; a trifunctional aziridine bond promoter; a filler; and a curing catalyst consisting essentially of a carboxylic acid anhydride and triphenyl bismuth. This embodiment omits magnesium oxide in the cure catalyst. The improvements may be utilized individually or in combination.

DESCRIPTION OF THE PREFERRED EMBODIMENT

Compositions curable to form a lining for a rocket motor comprise the reaction product of a hydroxyl terminated polybutadiene prepolymer (preferably about 40% of a material equivalent to that sold under the trademark R-45 HT by Arco Chemical Company, Philadelphia, Pennsylvania, less preferably a similar material sold by Arco as R-45M); an isocyanate curing agent (preferably about 13% of a material equivalent to that sold under the trademark DDI DIISOCYANATE available from General Mills Chemicals, Inc., Minneapolis, Minnesota) which will react with the prepolymer to form a urethane linkage; a curing catalyst comprising about 0.4% of a mixture of a carboxylic acid anhydride such as maleic anhydride, magnesium oxide, and triphenyl bismuth, preferably in equal parts by weight; bond promoters (preferably about 4% of a trifunctional aziridine such as trimesoyl 1-(2-ethyl)aziridine, sold under the trademark HX-868 by 3M Company, Minneapolis, Minnesota; and one or more fillers, preferably about 40% carbon black. Other ingredients may also be added to the reaction product.

Although maleic anhydride is a preferred catalyst component, any carboxylic acid anhydride may be substituted. Suitable carboxylic acid anhydrides include acetic, proprionic, oleic, succinic, phthalic, benzoic or naphthoic anhydride.

A preferred carbon black is an alkaline medium thermal carbon black sold under the trademark THERMAX by the R. T. Vanderbilt company of Norwalk, Connecticut. THERMAX carbon black has the following characteristics:

| | |
|---|---|
| density: | 1.80 MG/m$^3$ |
| sieve residue | |
| (#35 sieve) | 0.0001% max |
| (#325 sieve) | 0.1% max |
| heat loss (125° C.) | 1% max |
| ash content | 0.5% max |
| Toulene content | 1% max |
| pH: | alkaline |

| surface area: | 5.0 to 9.0 m²/gram |
|---|---|

THERMAX carbon black is preferred because it has a surface area of from about 5.0 to 9.0 m²/gram and thus provides an appropriate viscosity range for the cured liner composition.

Alkaline gas furnace carbon black having a maximum of 0.75 weight percent ash and a pH from about 7.0 to 10.7 is also a preferred filler.

Other carbon blacks generally known to be usable in rocket motor liner compositions can be used in the practice of this invention.

The temperature employed in blending and liner fabrication will desirably be low enough to assure that the cure reaction is not prematurely accelerated but high enough to maintain all ingredients in a homogeneous liquid state with a low enough viscosity to permit mechanical transfer and application. The compositions should have a fairly long pot life to permit all the blended material to remain homogeneous during manipulation. Once the liner is in place, it should be maintained at a high enough temperature to assure an expeditious cure. However, if the cure proceeds at an excessive temperature, distortion of the cured liner or propellant (due to induced thermal stresses) may occur, or the temperatures of some parts of the liner and propellant may vary, resulting in an irregular cure. Thus, the preferred curing temperature for use herein is from about 145 to about 170 degrees Fahrenheit (63° to 77° Celsius).

EXAMPLE I

Preparation of Liner Compositions

Liner compositions having the composition set forth in Table I are prepared; all quantities in Table I are by weight.

TABLE I

| | Formulation (Parts by Weight) | | |
|---|---|---|---|
| Material | TL-H763A | TL-H755A (Control) | TL-H763A |
| R-45M | — | 41.85 | — |
| R-45HT | 43.086 | — | 46.263 |
| DDI diisocyanate | 12.509 | 12.15 | 9.122 |
| HX 868 | 4.000 | 6.00 | 4.000 |
| Carbon Black | 40.000 (pH 8.1) | 40.00 | 40.000 (pH 8.5) |
| Magnesium Oxide | 0.135 | — | 0.205 |
| Maleic anhydride | 0.135 | — | 0.205 |
| Triphenyl bismuth | 0.135 | — | 0.205 |
| Total | 100.000 | 100.00 | 100.00 |

The liner compositions are made as follows. All the ingredients except carbon black are put in the mixing bowl of a vertical dough mixer or other suitable mixer and blended thoroughly. The carbon black is then slowly added while the mixer runs. After all ingredients have been added, mixing is continued at a vacuum of about 28 inches of mercury (an absolute pressure of about 65 millibars) for about 30 minutes. The mixer is then stopped, any material adhering to the mixing bowl or impellers is scraped into the mass being mixed, and the mixer is run 15 minutes longer.

Pot life of the liner compositions is defined here as the amount of time required for a freshly mixed sample of the liner material to reach a selected final viscosity when stored at about 77° F. (25° C.). The selected final viscosity is about 12 Kilopoise (Kp) in this example. Viscosity is measured with a Brookfield Viscometer.

The TL-H763A liner material according to the present invention increases in viscosity as set forth in Table II.

TABLE II

| TL-H763A Pot Life | |
|---|---|
| Hours | Viscosity (Kp) |
| 0 | 0.60 |
| 2 | 0.70 |
| 5 | 0.95 |
| 7 | 1.20 |
| 25 | 3.10 |
| 30 | 3.70 |
| 32 | 4.00 |
| 49 | 12.40 |

Based on graphical interpolation, the pot life of TL-H763A is about 49 hours. The TL-H763B liner material according to the present invention increases in viscosity in essentially the same manner as the TL-H763A liner composition and the estimated pot life of TL-H763B (calculation not shown) is essentially equivalent to the pot life of TL-H763A. By comparison, formulation TL-H755A has an estimated pot life under the same conditions of about 50 hours. These pot lives are provided for comparison purposes only, as a particular liner composition's pot life in practice depends upon the selected coating conditions, coating equipment, and other factors.

Curing time as defined herein has two parts. The first part is the time required for the Penetrometer reading for a sample of liner material to drop from an initial high value to 12.5mm. This interval is the precure time. The second part of curing time is the time required for the Penetrometer reading to drop from 12.5mm to about 5mm. This is the final cure time. Curing times can be measured at various temperatures. Cure time defined as above is only an approximation made for comparison purposes, as the completion of curing is more precisely determined by measuring the tensile properties of the composition.

The TL-763A material cures as shown in Table III below, which reports curing data at 77° F. (25° C.) and 145° F. (63° C.).

TABLE III

| TL-763A Curing Time | | |
|---|---|---|
| Hours | Penetrometer (25° C.) | Penetrometer (63° C.) |
| 5 | — | 22.5 mm |
| 5.5 | — | 8.70 |
| 6 | — | 6.20 |
| 23 | — | 1.30 |
| 30 | 34.6 mm | — |
| 54 | 19 | — |
| 55 | 16 | — |
| 57 | 13 | — |
| 58 | 6.5 | — |
| 77 | 3.9 | — |
| 79 | 3.0 | — |
| 101.5 | 1.2 | — |

By graphical analysis and interpolation of the data of Table III, the time required to precure to 12.5mm Penetrometer is found to be 5.5 hours at 145° F. (63° C.) and 58 hours at 77° F. (25° C.). The final cure time (Penetrometer reading drops from 12.5mm to 5.0mm) 1.0 hours at 145° F. (63° C.) and 16 hours at 77° F. (25° C.). This data illustrates that heat, such as a temperature of at least 135° F. (57° C.), activates the catalyst and thus hastens curing, while at room temperature compositions according to the present invention can have a long holding time without curing prematurely.

The curing time data parameters of TL-H763B are essentially the same as the data parameters for TL-H763A found in Table III. The curing time data parameter variances between the two compositions are insignificant.

It is noteworthy that the uncured TL-H763B composition is alkaline due to a high alkaline carbon black content (40 wt.% pH 8.5) and effective accelerated cure occurs in the alkaline environment thus provided.

The prior composition—TL-H755A—has a precure time of about 24 hours at 145° F. (63° C.) and a final cure time of about 168 hours at 145° F. (63° C.).

EXAMPLE II

Preparation of Rocket Motor Liner

A rocket motor casing is sandblasted on its inside surface and solvent degreased, conventional insulation is applied and cured, and a conventional primer is applied to all exposed inside surfaces of the casing and insulation. Freshly prepared liner material according to formulation TL-H763A or formulation TL-H763B of Example I is then applied to the primed surface by sling coating, a procedure in which liner material is piped to a rotating head which travels axially within the casing, throwing liner material outward against the surfaces to be coated. (The head consists generally of a pair of axially spaced rotating disks. Liner material is fed between the disks, flows outwardly on their surfaces as it gains angular momentum, and finally is thrown from the disks.) The liner is applied at a uniform thickness of about 60 mils (1.55mm).

Each lined casing is placed in a casting pit and precured for 4 to 6 hours at 145° F. (63° C.) at the same time the casing is preheated to receive the propellant grain. The propellant grain is cast adjacent to the liner, and the grain and liner are cocured at 170° F. (77° C.) until fully cured.

EXAMPLE III

Alternate Preparation of Rocket Motor Liner

The procedure of Example II is followed, except that the liner is precured in a 145° F. (63° C.) oven, then held at room temperature (25° C.) for 7 days before the casing is again preheated and the propellant grain is cast. The liner and grain are them cocured.

In both Examples II and III, the tensile strength of the bond between the cured liner and propellant grain is found to be greater in almost every case than the internal cohesion of the liner or propellant, which is indicative of a strong bond between the liner and propellant grain.

EXAMPLE IV

Of a variety of potential liners evaluated with Minimum Smoke propellants, two simple delayed quick cure liners have clearly demonstrated superior bond and bond aging characteristics to the highly plasticized Minimum Smoke propellant. The composition of two such liners as shown in Table IV are nearly the same with the 0.135% magnesium oxide removed from TL-H763A because of possible concern over long term high temperature incompatibilities of nitrato esters with the MgO. The cure chemistry of the two liners is identical and bond data to the propellant are identical. Therefore, the MgO-free TL-H774A liner has been demonstrated to be advantageous as well as unexpected.

TABLE IV

| Composition of TL-H763A and TL-774A Liners | | |
|---|---|---|
| Component | TL-H763A | TL-H774A |
| R-45HT | 45.501 | 45.526 |
| DDI Diisocyanate | 10.094 | 10.204 |
| HX-868 | 4.000 | 4.000 |
| Thermax Carbon Black | 40.000 | 40.000 |
| Maleic Anhydride | 0.135 | 0.135 |
| Triphenyl Bismuth | 0.135 | 0.135 |
| Magnesium Oxide | 0.135 | — |

The TL-H763A/TL-H774A liner system has demonstrated exceptional bonding characteristics with Minimum Smoke propellants, are the casing. These liners have a very low affinity for nitrate ester plasticizers, are low cost; have excellent processing characteristics, with a short precure and cure times, and exceptional versatility regarding formulation variations and liner hold time; and are a major contributor to the excellent aging characteristics of the Minimum Smoke bond systems. Of particular interest is the fact that these liners have been formulated through the use of the "delayed quick cure" system to exhibit similar cure profiles to the Minimum Smoke propellant. Such tailoring is critical to attaining the extraordinary peel and adhesion strength of these liners to the propellant.

The exceptional bond strength that has been obtained between the propellant and the liner is shown by peel and adhesion data presented in Tables V and VI. Table V contains 77° F. test results generated with propellant mixes. Table VI presents data from three propellant mixes showing the excellent propellant/liner bond strength that has been realized over a wide temperature range.

A series of tests have been performed to assure that the 0.020 inch liner thickness proposed in a motor design is adequate. The data shown in Table VII indicates constancy of peel and adhesion strength between TL-H774A liner and the propellant at liner thicknesses varying between 0.011 and 0.037 inch. These data suggest a high degree of confidence in the sufficiency of a 0.020 inch liner thickness for the proposed design.

Table VIII contains 77° F. peel data showing the very good bond that has been obtained with the selected liner system and a steel case.

TABLE V

| TP-Q7030 Propellant/Liner Bond Data 77° F. Test Temperature | | | | | |
|---|---|---|---|---|---|
| Propellant Mix Test No. | Liner | Peel (pli) | Failure | Adhesion (psi) | Failure |
| 1 | TL-H763A | 28.5 | PPFM | 46 | P |
| 2 | TL-H763A | 32.4 | P & B | 42 | P |
| 3 | TL-H763A | 32.0 | P | 51 | P |
| 4 | TL-H763A | 20.0 | PPFM | 59 | P |
| 5 | TL-H763A | 34.2 | P & PPFM | 40 | P |
| 6 | TL-H763A | 26.1 | P & B | — | — |
| 7 | TL-H763A | 24.9 | P | 39 | P |
| 8 | TL-H763A | 28.0 | B & PPFM | 46 | P |
| 9 | TL-H763A | 22.2 | PPFM | 40 | P |
| 10 | TL-H763A | 25.1 | PPFM | 37 | P |
| 11 | TL-H774A | 36.4 | P & B | 52 | P |
| 12 | TL-H774A | 34.4 | P | 57 | P |

*PPFM = propellant pulled from mold;
P = propellant;
B = bond.

TABLE VI

TP-Q7030 Propellant/Liner Bond Data

| Test No. | Liner | Test Temp. | Peel (pli) | Failure | Adhesion (psi) | Failure |
|---|---|---|---|---|---|---|
| 4 | TL-H763A | −45 | 14.0 | P | 441 | P |
|  |  | 77 | 28.0 | PPFM | 59 | P |
|  |  | 145 | 24.0 | PPFM | 36 | P |
| 10 | TL-H763A | −65 | 26.8 | B & PPFM | 787 | P |
|  |  | −45 | 22.0 | P | 390 | P |
|  |  | 0 | 51.9 | P | 106 | P |
|  |  | 77 | 26.5 | P & B | 51 | P |
|  |  | 165 | 17.5 | PPFM | 24 | P |
| 11 | TL-H774A | −50 | 19.7 | P & B | 828 | P |
|  |  | 77 | 36.4 | P & B | 52 | P |
|  |  | 160 | 18.8 | P & B | 32 | P |

TABLE VII

Effect Of Liner Thickness On TP-Q7030 Propellant/TL-H774A Liner Bond
77° Test Temperature

| Liner Thickness (0.001 in) | Peel (pli) | Failure* | Adhesion (psi) | Failure* |
|---|---|---|---|---|
| 11 | >39.2 | PPFM | 52 | P |
| 14 | >37.1 | PPFM | 57 | P |
| 17 | >32.4 | PPFM | 50 | P |
| 22 | 33.6 | P | 76 | P |
| 29 | >40.0 | P & PPFM | 55 | P |
| 37 | >35.1 | PPFM | 59 | P |

TABLE VIII

Liner To Case Bond
TL-H774A to Steel

| Bond Promoter Used On Steel | Test Temp. (°F.) | Peel (pli) |
|---|---|---|
| Chemlok 205 | 145 | >29.7 |
| None | 145 | 10.3 |
| Chemlok 205 | 77 | >44.1 |
| None | 77 | 19.2 |
| Chemlok 205 | −25 | >110.5 |
| None | −25 | >110.3 |

The excellent mechanical properties of the liner of the inventions are quite evident in the full temperature range (−65° to 160° F.) tensile test results found in Table IX. Some typical thermal properties of TL-H763A are:

| Thermal Expansion | |
|---|---|
| 27 to −46° C. | 21.28 × 10⁻⁵ cm/cm/°C. |
| (80 to −50° F.) | (11.82 × 10⁻⁵ in/in/°F.) |
| Glass Transition | −68 to −78° C. |
|  | (90.4 to 108.4° F.) |
| Thermal Conductivity | 6.09 × 10⁴ cal/cm/sec/°C. |
| Specific Heat | 4.016 × 10⁻¹ cal/g/°C. |

TABLE IX

Mechanical Properties Of TL-H774A Liner

| Test Temp. (° F.) | Ultimate Stress (psi) | Ultimate Strain (%) |
|---|---|---|
| 160 | 304 | 205 |
| 120 | 192 | 287 |
| 77 | 472 | 339 |
| 20 | 845 | 489 |
| 0 | 1145 | 478 |
| −35 | 1445 | 401 |
| −65 | 2044 | 309 |

The excellent storage stability that has been demonstrated by the Minimum Smoke bond system is shown by the peel data found in Table X. It will be noted that this 12-month aging study is evaluating the storage stability of three interfaces (propellant/liner, liner/aluminum, and liner silver) at 77° and 145° F. It can be see that there was no evidence of bond strength degradation during twelve months of exposure to these two temperatures. In all subscale and full scale motor testing with the TL-H763A/TL-H774A liner, no evidence of smoke generation from the liner is evident even under tail-off conditions.

TABLE X

Liner Bond Aging Data
(TP-Q7030 Propellant, Mix W-96; TL-H763A liner, LM-23926)
77° F. Test Temperature

| System | Storage Temperature (°F.) | Time (Mo.) | Peel (pli) | Failure* |
|---|---|---|---|---|
| Propellant/Liner | 77 | 0 | 25.1 | PPFM |
|  |  | 1 | 23.3 | PPFM |
|  |  | 3 | 23.1 | PPFM |
|  |  | 6 | 26.8 | PPFM |
|  |  | 9 | 27.1 | PPFM |
|  |  | 12 | 24.4 | PPFM |
|  | 145 | 0 | 25.1 | PPFM |
|  |  | 1 | 24.0 | PPFM |
|  |  | 3 | 27.2 | PPFM |
|  |  | 6 | 30.7 | PPFM |
|  |  | 9 | 32.8 | PPFM |
|  |  | 12 | 25.7 | PPFF |
| Liner/Aluminum | 77 | 0 | 40.0 | T |
|  |  | 3 | 68.2 | T & LPFS |
|  |  | 6 | 56.6 | T |
|  |  | 9 | 55.8 | T |
|  |  | 12 | 60.2 | T |
|  | 145 | 0 | 40.0 | T |
|  |  | 1 | 30.8 | LPFS |
|  |  | 3 | 40.3 | LPFS |
|  |  | 6 | 33.7 | T & LPFS |
|  |  | 9 | 31.5 | T |
|  |  | 12 | 30.2 | LPFS |
| Liner/Silver | 77 | 0 | 45.3 | L & T |
|  |  | 3 | 58.6 | T |
|  |  | 6 | 58.9 | T |
|  |  | 9 | 53.9 | T |
|  |  | 12 | 44.9 | T |
|  | 145 | 0 | 45.3 | L & T |
|  |  | 1 | 31.2 | LPFS |
|  |  | 3 | 44.6 | LPFS |
|  |  | 6 | 35.1 | LPFS |
|  |  | 9 | 31.2 | T |
|  |  | 12 | 32.1 | LPFS |

*PPFM = propellant pulled from mold;
T = tab;
LPFS = liner pulled from screen;
L = liner.

We claim:

1. In the process of applying a rocket motor liner to an inside surface of a rocket motor casing by coating said casing with a rocket motor liner composition and then curing said liner composition; wherein the improvement comprises using a rocket motor liner composition comprising the product of a hydroxyl terminated polybutadiene prepolymer; a diisocyanate curing agent for forming urethane linkages with said prepolymer; a trifunctional aziridine bond promoter; a filler; and a curing catalyst consisting essentially of a carboxylic acid anhydride and triphenyl bismuth and not including magnesium oxide.

2. The process of claim 1, wherein said liner composition comprises:
   a. about 43% by weight of said prepolymer;
   b. about 12% of said curing agent;

c. about 4% of said bond promoter;
d. about 40% of said filler; and
e. about 0.4% of said curing agent.

3. The process of claim 1, wherein said carboxylic acid anhydride is maleic anhydride.

4. The process of claim 1, wherein said carboxylic acid is formed in situ.

5. The process of claim 4, wherein said carboxylic acid is formed in situ by reaction of carboxylic acid anhydride with an OH containing moiety.

6. The process of claim 1, wherein said filler is an alkaline carbon black filler which provides an alkaline environment.

* * * * *